United States Patent
Im

(10) Patent No.: US 9,189,068 B2
(45) Date of Patent: Nov. 17, 2015

(54) APPARATUS AND A METHOD FOR GESTURE RECOGNITION

(75) Inventor: Soungmin Im, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 810 days.

(21) Appl. No.: 13/047,292

(22) Filed: Mar. 14, 2011

(65) Prior Publication Data

US 2012/0235903 A1 Sep. 20, 2012

(51) Int. Cl.
| G06F 3/01 | (2006.01) |
| G06F 3/00 | (2006.01) |
| G06F 3/03 | (2006.01) |
| G06K 9/00 | (2006.01) |

(52) U.S. Cl.
CPC .............. *G06F 3/017* (2013.01); *G06F 3/005* (2013.01); *G06F 3/0304* (2013.01); *G06K 9/00355* (2013.01)

(58) Field of Classification Search
CPC ... G06K 9/00355; G06F 3/005; G06F 3/0304; G06F 3/017
USPC .................................................. 345/156–157
See application file for complete search history.

(56) References Cited

U.S. PATENT DOCUMENTS

| 8,373,654 B2* | 2/2013 | Wang et al. .................... 345/156 |
| 8,817,087 B2* | 8/2014 | Weng et al. ...................... 348/77 |
| 2008/0170776 A1* | 7/2008 | Albertson et al. ............. 382/154 |
| 2008/0273755 A1* | 11/2008 | Hildreth ......................... 382/103 |
| 2009/0315740 A1* | 12/2009 | Hildreth et al. ................... 341/20 |
| 2010/0290674 A1* | 11/2010 | Kim ............................... 382/106 |
| 2011/0267258 A1* | 11/2011 | Wang et al. .................... 345/156 |
| 2012/0105613 A1* | 5/2012 | Weng et al. ...................... 348/77 |

FOREIGN PATENT DOCUMENTS

| KR | 10-2007-0055210 A | 5/2007 |
| KR | 10-2010-0122988 A | 11/2010 |
| KR | 10-2011-0021500 A | 3/2011 |

* cited by examiner

*Primary Examiner* — Amare Mengistu
*Assistant Examiner* — Sarvesh J Nadkarni
(74) *Attorney, Agent, or Firm* — Birch, Stewart, Kolasch & Birch, LLP

(57) ABSTRACT

The present invention relates to a method for gesture recognition and an apparatus for gesture recognition carrying out the method. More specifically, the present invention relates to a method for gesture recognition recognizing a finger gesture by using depth information and an apparatus for gesture recognition carrying out the method.

14 Claims, 11 Drawing Sheets depth value

——— A first image
------ A second image
▨ An area where depth information is different ——— A first image
------- A second image
▨ An area where depth information is different ——— A first image
------ A second image
▧ An area where depth information is different

Fig. 19

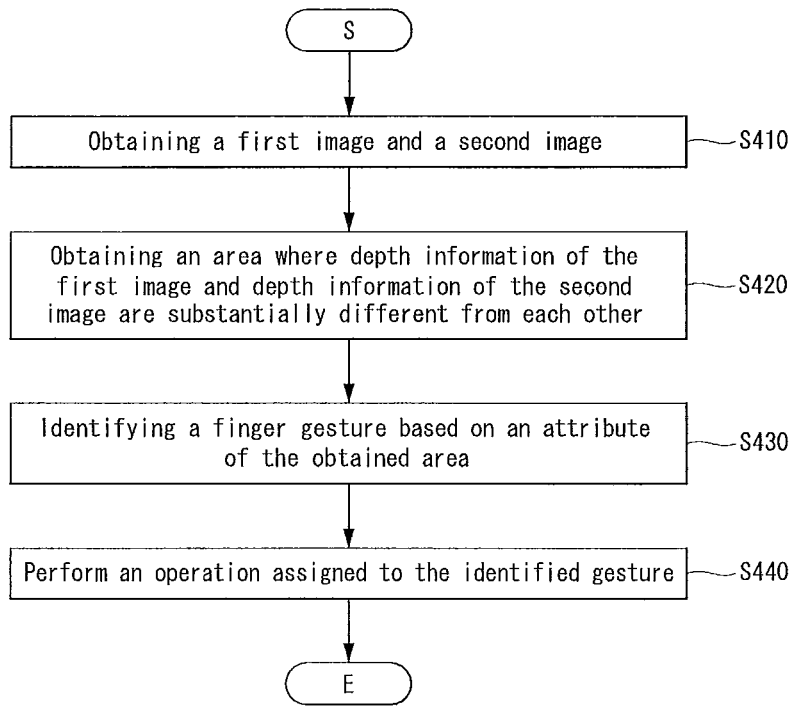

Fig. 20

| Gesture | Motion of folding a finger | Motion of unfolding a finger | Motion of folding-unfolding a single finger | Motion of folding-unfolding two fingers |
|---|---|---|---|---|
| Obtained area | | | | |

Fig. 21

| Gesture | Motion of folding a finger | Motion of unfolding a finger | Motion of folding-unfolding a single finger | Motion of folding-unfolding two fingers |
|---|---|---|---|---|
| Assigned operation | Release operation Enter a drag mode | Press operation Release a drag mode (drop) | Click | Double click |

120

120

APPARATUS AND A METHOD FOR GESTURE RECOGNITION

BACKGROUND OF THE INVENTION

1. Field of the Invention

The present invention relates to an apparatus and a method for gesture recognition. More specifically, the present invention relates to a method for recognizing a finger gesture by using depth information and an apparatus for carrying out the method.

2. Discussion of the Related Art

Due to the need to provide products with enhanced user convenience in the IT industry, various kinds of research on more comfortable, intuitive user interfaces are being conducted actively.

At the core of the interface technology, a gesture interface that enables the user to operate products without using a separate input apparatus, but by using the user's natural motion is getting great attention from the public.

SUMMARY OF THE INVENTION

One aspect of the present invention is to provide a method for gesture recognition that enables a user to operate an apparatus for gesture recognition without relying on a separate input unit and the apparatus for carrying out the method.

Another aspect of the present invention is to provide a method for recognizing a finger gesture and an apparatus for carrying out the method.

Yet another aspect of the present invention is to provide a method for gesture recognition that enables the user to operate an apparatus for gesture recognition with a minimal motion based on a finger gesture and the apparatus for carrying out the method.

Yet another aspect of the present invention is to provide a method for gesture recognition without a learning step about the change of a hand shape and an apparatus for carrying out the method.

Yet another aspect of the present invention is to provide a method for recognizing at least one finger gesture in a robust manner independently of an angular pose of the finger and an apparatus for carrying out the method.

Yet another aspect of the present invention is to provide a method for gesture recognition with a high recognition rate for a finger gesture and an apparatus for carrying out the method.

Yet another aspect of the present invention is to provide a method for identifying various finger gestures and an apparatus for carrying out the method.

The aspects of the present invention are not limited to what have been described above, but those not mentioned above would be clearly understood from the description to be provided below by those skilled in the art to which the present invention belongs.

According to one aspect of the present invention, an apparatus for gesture recognition includes a 3D camera configured to obtain depth information; and a controller configured to: obtain, via the 3D camera, a first image having first depth information and a second image having second depth information, wherein each of the first and the second images includes a hand respectively, and identify a finger gesture of the hand based on the first depth information and the second depth information.

According to another aspect of the present invention, an apparatus for gesture recognition includes a 3D camera configured to obtain depth information; and a controller configured to: obtain, via the 3D camera, a first image having first depth information and a second image having second depth information, wherein each of the first and the second images includes a hand respectively, and identify a finger gesture of the hand based on an attribute of an area where the first depth information and the second depth information are substantially different from each other. At this time, the attribute of the area includes at least one of a size, a width, and a deviation of the area.

According to yet another aspect of the present invention, an apparatus for gesture recognition includes a camera; and a controller configured to: obtain, via the camera, a first depth image and a second depth image, each of the first depth image and the second depth image including a first object respectively, identify a gesture of a second object connected to the first object based on the first depth image and the second depth image, and perform a predetermined operation according to the identified gesture.

According to one aspect of the present invention, a method for gesture recognition includes obtaining a first depth image and a second depth image, each of the first depth image and the second depth image including a hand respectively; and identifying a finger gesture of the hand based on the first depth image and the second depth image.

BRIEF DESCRIPTION OF THE DRAWINGS

The accompany drawings, which are included to provide a further understanding of this document and are incorporated on and constitute a part of this specification, illustrate embodiments of this document and together with the description serve to explain the principles of this document.

FIG. 19 is a flow chart of a fourth embodiment of a method for gesture recognition according to the present invention;

FIG. 20 illustrates various examples of finger gesture assigned to the attribute of an obtained area in the fourth embodiment of a method for gesture recognition according to the present invention;

FIG. 21 illustrates examples of motions associated with finger gesture(s) in the fourth embodiment of a method for gesture recognition according to the present invention;

DETAILED DESCRIPTION OF THE INVENTION

Terminologies used in this document have been introduced for the convenience of describing the embodiments of the present invention. Therefore, the present invention is not limited by the terminologies used in this document.

The embodiments of the present invention can be modified or changed without deviating from the principles and the scope of the present invention. At this time, the modification or change within the principles and the scope of the present invention should be clearly understood by those skilled in the art. Therefore, the present invention includes various examples of modification or change belonging to the principles and the scope of the present invention. Also the present invention is not limited by those embodiments to be described later.

In what follows, the embodiments of the present invention will be described in detail with reference to appended drawings, in which like numerals refer to like elements and redundant descriptions are omitted.

Figure 1:
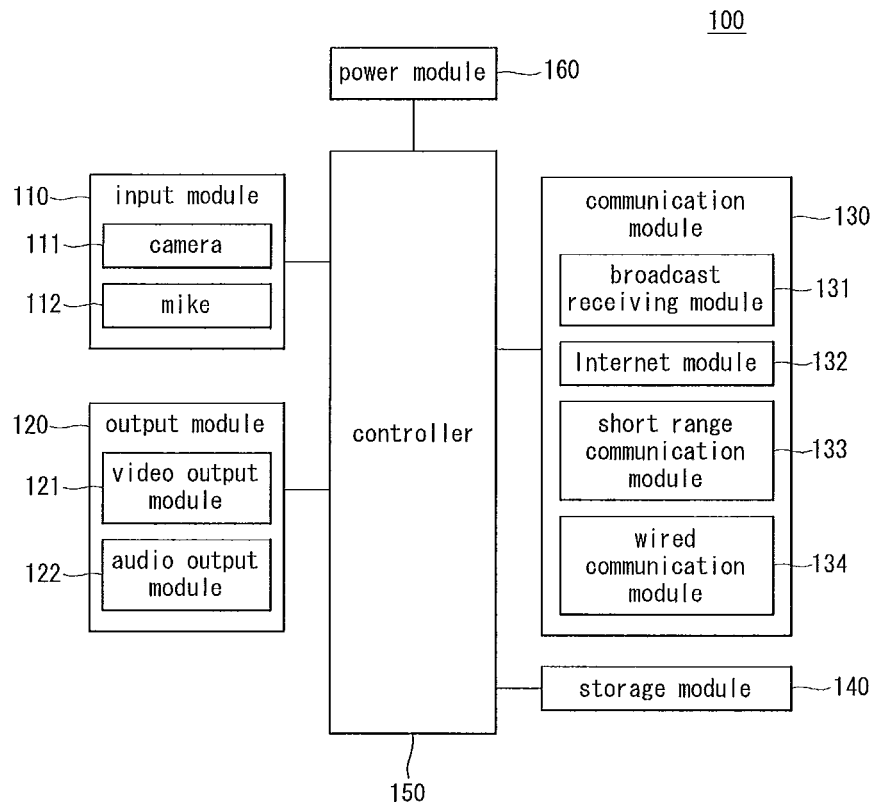
FIG. 1 illustrates a block diagram of one embodiment of an apparatus for gesture recognition according to the present invention.

In what follows, an apparatus for gesture recognition 100 according to an embodiment of the present invention will be described with reference to FIG. 1. FIG. 1 illustrates a block diagram of one embodiment of an apparatus for gesture recognition 100 according to the present invention.

The apparatus for gesture recognition 100 can recognize various finger gestures and carry out operations according to the recognition result. The apparatus for gesture recognition 100 can take a picture of a hand and its surrounding area, obtain an image including depth information, and recognize a finger gesture made by one or more fingers of the hand by analyzing the depth information of the image.

The apparatus for gesture recognition 100 according to the present invention can be implemented in the form of at least one from among a mobile phone, a smart phone, a notebook computer, a desktop computer, a terminal for digital broadcasting, a television, a personal digital assistant (PDA), a portable multimedia player (PMP), a navigation terminal, and any similar device well-known to those skilled in the art to which the present invention belongs.

The apparatus for gesture recognition 100, as shown in FIG. 1, can comprise at least one of an input module 110 receiving inputs, an output module 120 outputting information, a communication module 130 carrying out communication, a storage module 140 storing information, a controller 150 controlling the overall operation of the apparatus for gesture recognition 100, and a power module 160 providing power to the apparatus for gesture recognition 100. Each of the constituting modules is not necessarily included in the apparatus for gesture recognition 100. Therefore, the apparatus for gesture recognition 100 can comprise the aforementioned constituting modules selectively. All the components of the apparatus 100 are operatively coupled.

The input module 110 can receive inputs. The user can directly operate the apparatus for gesture recognition 100 through the input module 110. The input module 110 can include at least one from among a keyboard, a touch screen, a camera 111, a mike (microphone) 112, and any similar device well-known to those skilled in the art to which the present invention belongs.

The camera 111 can receive optical signals and can be part of the apparatus 100 or can be an external device (FIG. 3) communicating with the apparatus 100. The camera 111 can process still images or moving pictures in a video communication mode or an image capture mode. The images processed by the camera 111 can be stored in the storage module 140 or can be transmitted to the outside through the communication module 130, or the processed images can be displayed by the output module 120.

The camera 111 can be implemented by either a 2D camera or a 3D camera.

A 2D camera can obtain two-dimensional images by receiving incoming light from the outside and obtaining intensity or color information from the received light. For example, the 2D camera can obtain color images from the visible light received from an image sensor implemented by charge coupled device (CCD) or complementary metal oxide semiconductor (CMOS).

A 3D camera can obtain a depth image by receiving incoming light from the outside and obtaining depth information from the received light. The 3D camera can obtain depth information about the distance to a subject in real-time by emitting light to the subject and receiving the reflected light from the subject by using a depth sensor.

The 3D camera can be a TOF (time-of-flight) camera, for example. A TOF camera can be the camera 111 that obtains depth information by using the time-of-flight (TOF) principle. The TOF camera emits infrared light or laser by using light emitting diode(s) (LED) in the form of a short pulse and receives a reflected pulse of light, where the elapsed time between the two events is measured by using the light pulse received by a TOF sensor. The TOF camera then determines the distance to the subject, thereby obtaining the depth information. At this time, the TOF camera can measure the elapsed time based on the phase difference between the emitted and the received pulse of light. The depth information preferably means distance information which can include a distance between the camera and the subject being captured by the camera.

The above method of obtaining depth information directly from a 3D camera does not require complex computations and suffers little error compared with an indirect method of obtaining depth information based on computer vision technology utilizing multiple 2D images.

Meanwhile, the 3D camera can obtain an intensity image according to the intensity or strength of reflected light as well as the depth image. Since the intensity image contains information reflecting the color, temperature, and brightness of a subject as well as the information about distance (depth) to the subject, the user can easily recognize the image.

The mike 112 receives external audio signals through a microphone in a communication, recording, or voice recognition mode and converts the received signals to electrical voice data. The mike 112 can employ various kinds of noise suppression algorithms to remove noise generated while receiving external audio signals.

The output module 120 can output information. The user can receive various kinds of information from the apparatus for gesture recognition 100 through the output module 120.

The output module 120 can output information by using at least one of visual, aural, or tactile signals. The output module 120 can include at least one from among a display, a speaker, a vibrator, and any similar device well-known to those skilled in the art to which the present invention belongs.

The output module 120 can include either a video output module 121 or an audio output module 122. The video output module 121 can display information. For example, the video output module 121 can display a user interface (UI) or a graphic user interface (GUI).

The video output module 121 can be implemented by using at least one of liquid crystal display (LCD), thin film transistor-liquid crystal display (TFT-LCD), organic light-emitting diode (OLED), a flexible display, and a 3D display.

The display can be either transparent or light transmitting type display that is fabricated with light transmitting material. Such a light transmitting display is called a transparent display. A representative example of transparent display is transparent LCD. The rear structure of such a display can also be implemented by light transmitting type structure. Due to the transparent display, the user can see an object positioned behind the apparatus for gesture recognition 100 through the display area of the apparatus for gesture recognition 100.

The video output module 121 is not necessarily implemented by a single display, but can include multiple displays. For example, the video output module 121 can be implemented in the form of displays disposed being separated from each other or as a single body on a single surface; or in the form of displays each disposed on different surfaces.

Meanwhile, the input module 110 and the output module 120 can be implemented as a single device. For example, the input module 110 and the output module 120 can be realized as a touch screen in which a display and a touch sensor sensing touch inputs form a single layer. Such a touch screen can receive touch signals while displaying information. The touch screen in this kind can incorporate touch sensor in the form of a touch film, a touch sheet, or a touch pad.

The touch sensor can be composed in such a way to convert a change in the pressure applied to a particular part of the touch screen or a change in the capacitance generated at a particular part of the touch screen into an electrical input signal. The touch sensor can be composed to detect a touch pressure as well as a touch position and a touch area.

When a touch input is applied to the touch sensor, a signal corresponding to the input can be transmitted to a touch controller. The touch controller processes the signal and then transmits a signal corresponding to the processed signal to the controller 150. By doing so, the controller 150 can determine which part of the touch screen has been touched.

The audio output module 122 can output audio data either received from the communication module 130 or stored in the storage module 140. The audio output module 122 can output audio signals related to various functions carried out in the apparatus for gesture recognition 100. The audio output module 122 can include a receiver, a speaker, a buzzer, and the like.

The communication module 130 can carry out communication. The communication module 130 can carry out communication with various types of external devices through various kinds of communication networks. The communication module 130 can include various communication modules.

For example, the communication module 130 can include at least one from among a broadcast receiving module 131, an Internet module 132, a short range communication module 133, and a wired communication module 134.

The broadcast receiving module 131 can receive broadcasting signals and/or broadcasting-related information from an external broadcasting server through a broadcasting channel. The broadcasting channel can include a satellite channel or a terrestrial broadcasting channel. The broadcasting server can be a server generating and transmitting broadcasting signals and/or broadcasting-related information; or a server receiving pre-generated broadcasting signals and broadcasting-related information and transmitting them to terminals. The broadcasting signals and/or broadcasting-related information received through the broadcast receiving module can be stored in the storage module 140.

At this time, the broadcasting signal can include a TV broadcasting signal, a radio broadcasting signal, a data broadcasting signal, or a combination of the signals.

The broadcasting-related information can correspond to the information related to broadcasting channels, broadcasting programs, or broadcasting service providers. The broadcasting-related information can be provided through a dedicated communication network.

The broadcasting-related information above can take various forms: for example, the electronic program guide (EPG) in the digital multimedia broadcasting (DMB) or the electronic service guide (ESG) in the digital video broadcast-handheld (DVB-H).

The broadcast receiving module 131 can receive broadcasting signals through various broadcasting systems. The broadcasting system that can be linked to a broadcast transmitting/receiving module 125 can include at least one from among DMBT (digital multimedia broadcasting terrestrial), DMBS (digital multimedia broadcasting satellite), MediaFLO (media forward link only), DVBH (digital video broadcast handheld), ISDBT (integrated services digital broadcast terrestrial), and any broadcasting system well-known to those skilled in the art to which the present invention belongs.

The broadcast receiving module 131 can transmit or receive broadcasting information, traffic information, living information, and other information needed directly or indirectly for the operation of vehicles to and from such a broadcasting system.

The Internet module 132 can transmit or receive various kinds of information through the Internet. The Internet module 132 can be embedded in the apparatus for gesture recognition 100 or prepared in the form of an external device.

The Internet module 132 can be connected to the Internet through wired or wireless connection; for example, the Internet module 132 can be connected to the Internet according to at least one of WLAN (wireless LAN), WiBro (Wireless Broadband), WiMAX (World Interoperability for Microwave Access), HSDPA (High Speed Downlink Packet Access), and other communication specifications.

The short range communication module 133 can carry out short range wireless communication. The short range communication module 133 can employ Bluetooth, RFID (Radio Frequency Identification), IrDA (Infrared Data Association), UWB (Ultra Wideband), or ZigBee.

The short range communication module 133 can communicate with various kinds of external devices located within a short range; for example, the short range communication module 133 can carry out communication with a remote controller controlling the apparatus for gesture recognition 100 remotely.

The wired communication module 134 can connect the apparatus for gesture recognition 100 to external devices through wired connection. The wired communication module 134 can carry out communication with external devices through various interfaces. For example, the wired communication module 134 can carry out communication through at least one interface from among a USB (Universal Serial Bus) module that can communicate through a USB port, a port compliant with RS-232 specifications, a headset port, an external charger port, a data port, a memory card port, an audio I/O (Input/Output) port, a video I/O port, and an earphone port.

The configuration of the communication module 130 and the method by which the communication module 130 communicates are not limited by the aforementioned example. The communication module 130 can include at least one from among the aforementioned communication module and other communication devices well-known to those skilled in the art to which the present invention belongs and accordingly, communicate through at least one communication method among various communication specifications.

Also, the communication module 130 does not have to communicate through only a single communication module, but depending on the needs, can communicate with a plurality of external devices through multiple communication modules at the same time.

The storage module 140 can store information. The storage module 140 can store information required for the operation of the apparatus for gesture recognition 100 and the information generated by the operation of the apparatus for gesture recognition 100. At this point, the information required for the operation of the apparatus for gesture recognition 100 can include information about OS (Operating System), while the information generated by the operation of the apparatus for gesture recognition 100 can include still images, moving pictures, rendering information, volume information, and the like.

The storage module 140 can include various types of storage media. For example, the storage module 140 can include at least one from among flash memory, RAM (Random Access Memory), SRAM (Static Random Access Memory), ROM (Read Only Memory), EEPROM (Electrically Erasable Programmable Read Only Memory), hard disk, magnetic memory, a magnetic disc, an optical disc such as CD (Compact Disc) and Bluray disc, a card-type memory such as SD card, and other storage medium well-known to those skilled in the art to which the present invention belongs.

The storage module 140 can be realized in the form of being embedded in the apparatus for gesture recognition 100, in a detachable form, or in the form of an external device.

Meanwhile, the apparatus for gesture recognition 100 can also operate by utilizing a web-storage in the Internet that provides the same storage function as the storage module 140.

The controller 150 can control the overall operation of the apparatus for gesture recognition 100 and other constituting elements of the apparatus for gesture recognition 100. For example, the controller 150 can link various kinds of information to each other and process the information to be available.

The controller 150 can be implemented in the form of a computer or any device similar to the computer by using software, hardware, or a combination of both.

The controller 150, when viewed as hardware, can be implemented by at least one from among ASICs (application specific integrated circuits), DSPs (digital signal processors), DSPDs (digital signal processing devices), PLDs (programmable logic devices), FPGAs (field programmable gate arrays), processors, controllers, micro-controllers, microprocessors, and any electronic device for carrying out control functions well-known to those skilled in the art to which the present invention belongs.

The controller 150, when viewed as software, can be realized by software codes written by one or more programming languages or software applications. The software can be stored in the storage module 140 and can be executed by the hardware configuration of the controller 150. Also, the software can be installed in the apparatus for gesture recognition 100 as the software is transmitted to the apparatus for gesture recognition 100 from an external device such as a server.

Detailed description of the controller 150 will be provided later when a method of updating map data according to the present invention is described.

The power module 160 can provide power to the apparatus for gesture recognition 100. The power module 160, receiving external power or internal power by the control of the controller 150, can provide power required for the operation of each constituting element of the apparatus for gesture recognition 100.

In what follows, a method for gesture recognition according to an embodiment of the present invention will be described.

A method for gesture recognition according to an embodiment of the present invention is described by using the apparatus for gesture recognition 100 according to the present invention. At this time, the apparatus for gesture recognition 100 is employed for the convenience of describing a method for gesture recognition according to the present invention. Therefore, the method for gesture recognition according to the present invention is not limited to the apparatus for gesture recognition 100 according to the present invention.

The method for gesture recognition according to the present invention can also be carried out by using other devices carrying out the same function as the apparatus for gesture recognition 100 according to the present invention.

Besides, in the method for gesture recognition according to an embodiment of the present invention, although the apparatus for gesture recognition 100 can recognize finger gestures, it is not necessarily limited to finger recognition. In other words, the apparatus for gesture recognition 100 can also recognize gestures made by other body parts rather than the finger(s) or by some tools that can be used as substitute for the user's finger such as a pen and a writing tool. A finger gesture is any gesture made by one or more fingers.

Figure 2:
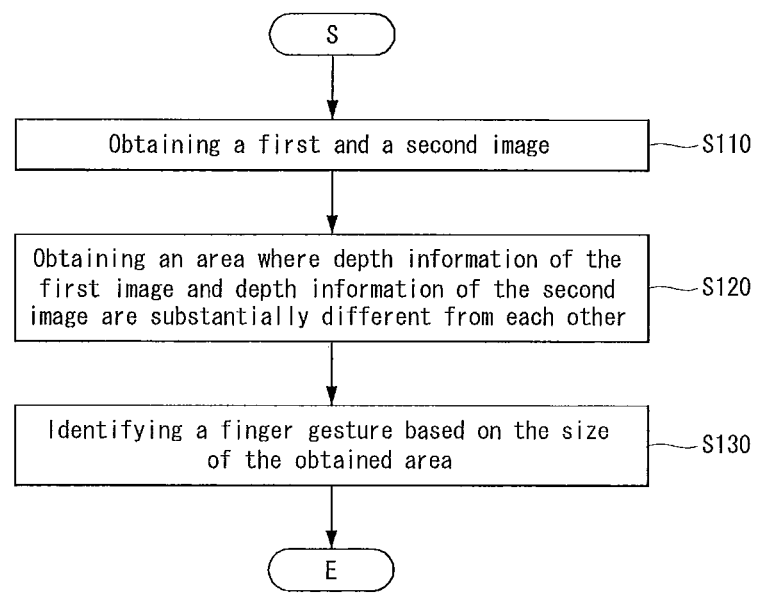
FIG. 2 is a flow chart of a first embodiment of a method for gesture recognition according to the present invention.

In what follows, a first embodiment of a method for gesture recognition according to the present invention will be described with reference to FIG. 2. FIG. 2 is a flow chart of a first embodiment of a method for gesture recognition according to the present invention.

As shown in FIG. 2, the first embodiment of a method for gesture recognition according to the present invention can comprise at least one of obtaining a first and a second image S110; obtaining an area where a substantial depth difference occurs based on the depth information of the first and the second image S120; and recognizing a finger gesture based on the size of the obtained area S130. In the following, each step of the first embodiment of the present invention will be described in detail.

Figure 3:
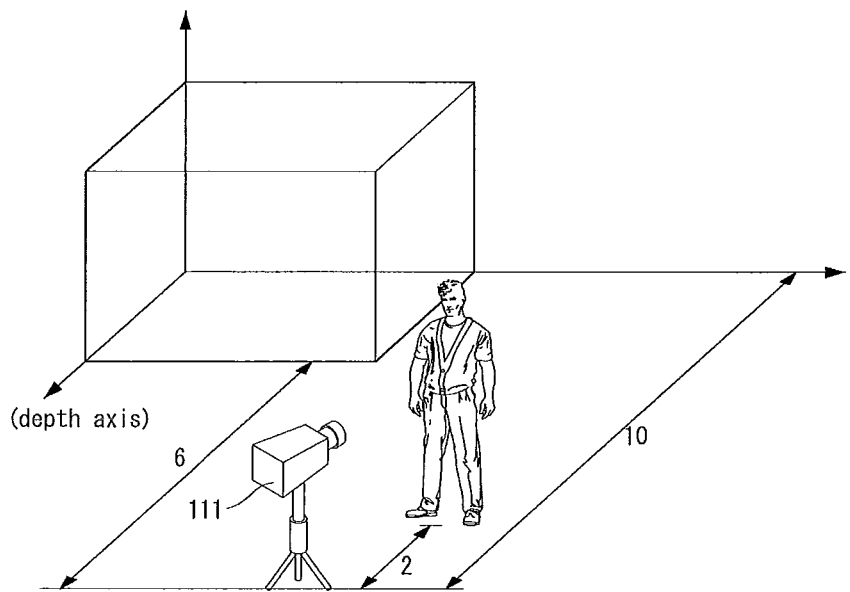
FIG. 3 illustrates a camera obtaining depth information in the first embodiment of a method for gesture recognition according to the present invention.
Figure 4:
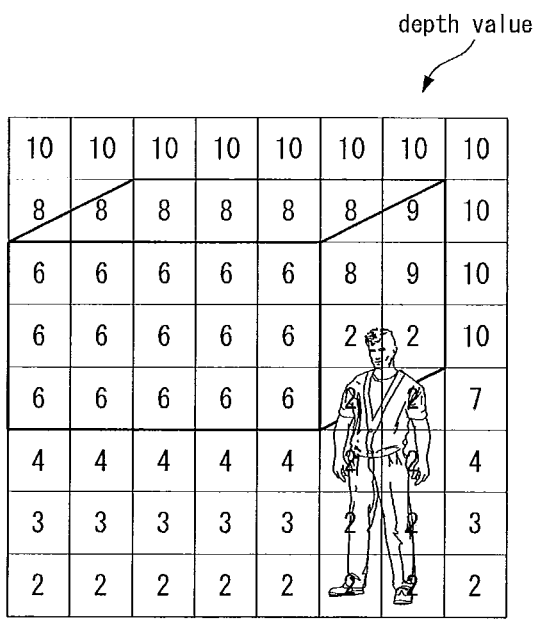
FIG. 4 illustrates depth information obtained from the camera in the first embodiment of a method for gesture recognition according to the present invention.
Figure 5:
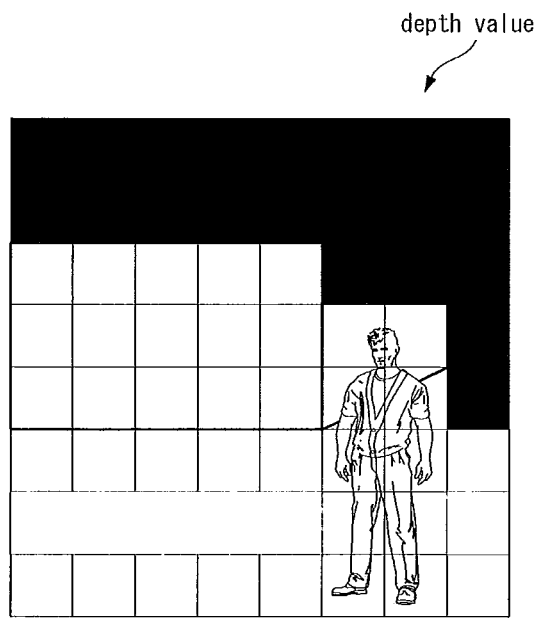
FIG. 5 illustrates an image reflecting depth information in the first embodiment of a method for gesture recognition according to the present invention.

The apparatus for gesture recognition 100 can obtain a first and a second image S110. Regarding to the current step, description will be provided with reference to FIGS. 3, 4, and 5. FIG. 3 illustrates a camera 111 obtaining depth information in the first embodiment of a method for gesture recognition according to the present invention; FIG. 4 illustrates an example of depth information obtained from the camera 111 in the first embodiment of a method for gesture recognition according to the present invention; FIG. 5 illustrates an image reflecting the depth information in the first embodiment of a method for gesture recognition according to the present invention.

The camera 111 can obtain depth information reflecting the distance from the camera 111 to a subject being captured. At this time, the depth information can correspond to the information reflecting the position of the captured data in the three-dimensional space.

For example, as shown in FIG. 3, the camera 111, implemented by the TOF camera described above, can obtain depth information by estimating the distance to a subject (e.g., person) in question according to the elapsed time between emission of light to the subject and arrival of the light reflected from the subject.

In this case, as shown in FIG. 4, the depth information can be expressed in the form of a range value for each pixel. The numerical range of the range value can be predetermined. For example, the range data can take a value ranging from 0 to 255 as the distance to the subject increases. Therefore, a depth value of 255 corresponds to the maximum distance that the camera 111 can measure.

Meanwhile, the depth resolution can be increased as the range of the depth value according to the depth information becomes large. In the cases of FIGS. 3 and 4, since the depth value corresponding to 10 m is 50, one unit of the depth value corresponds to the distance of 0.2 m in the actual space. In other words, the depth resolution is 0.2 m.

Meanwhile, the controller 150 can obtain an image including the depth information, namely, a depth image through the camera 111. The depth image can be expressed by in the form of an intensity or color image reflecting the distribution of distance values in the depth image. For example, as shown in FIG. 5, the depth image can be represented by an intensity image in such a way that the intensity value for each pixel becomes small in proportion to the increase of the range value at the corresponding pixel.

The controller 150 can obtain the first and the second image through the camera 111. The first and the second image each include depth information. The first and second images can correspond to images taken by the camera 111 at different times. As such, an analysis of the depth information of the first and second images can determine a movement or change from the first image to the second image, e.g., a change or movement of a part of the subject here being the person.

In addition to the above, the camera 150 can employ various ways of obtaining an image reflecting the depth information through the camera 111.

The method of obtaining depth information or a depth image can be divided into a direct and an indirect approach.

One method of direct approach directly measures the distance from the camera 111 to a target object by using a 3D camera or a depth camera such as the aforementioned TOF camera and obtains depth information or an depth image from the measurement results.

A direct approaches can include techniques based on a three dimensional scanner or structured light. Such direct approaches provide accurate 3D coordinate values at relatively high speed and are not influenced by the error due to lighting conditions. A structured light source camera emits infrared light to a target object and analyzes the scattering pattern of the infrared light reflected from the object, thereby obtaining depth information to the target object.

In the case of a TOF camera, image acquisition speed amounts to tens of images per second; therefore, depth information can be obtained in real-time.

On the other hand, the indirect approach obtains depth information by analyzing at least two or more 2D images captured at different view points. A prototypical method in this kind is a stereo matching technique.

The stereo matching technique makes use of the images obtained from two, left and right cameras 111; by setting one of the two images as a reference image and the other a search image, calculates the difference between the corresponding image coordinates in the reference and the search image for a point in the space; and thus obtains a disparity value for the particular pixel in the reference image. By repeating the process for all the pixels in the reference image, obtained is a disparity map where the distribution of disparities is stored in the form of an image.

In other words, the indirect approach extracts disparity maps from the images obtained at various view points, and obtains 3D information by arranging and combining the disparity maps in a common coordinate frame based on the information of the cameras 111.

The indirect approach may be vulnerable to error due to lighting conditions and the texture of a target object, shows low reliability when occlusion appears, and requires relatively long computation time to obtain a dense disparity map.

Figure 6:
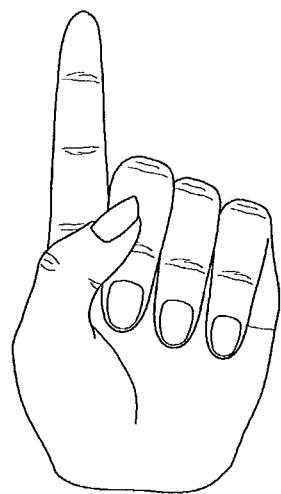
FIG. 6 is a drawing illustrating a first image of a hand in the first embodiment of a method for gesture recognition according to the present invention.
Figure 7:
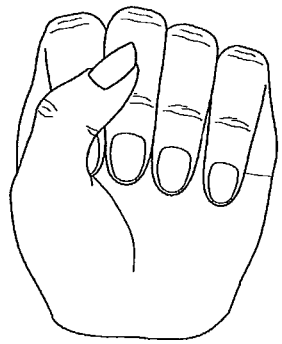
FIG. 7 is a drawing illustrating a second image of a hand in the first embodiment of a method for gesture recognition according to the present invention.
Figure 8:
FIG. 8 is a drawing illustrating the area obtained based on each depth information of the first and the second image in the first embodiment of a method for gesture recognition according to the present invention.
Figure 9:
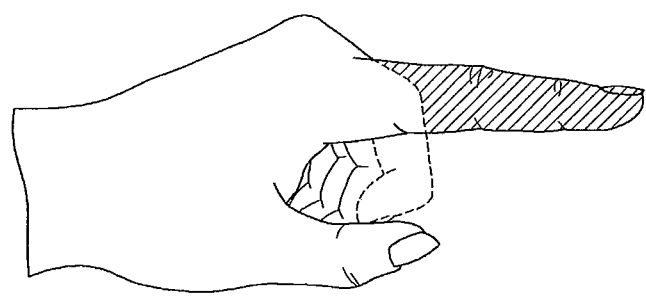
FIG. 9 is another drawing illustrating an image of a hand in the first embodiment of a method for gesture recognition according to the present invention.
Figure 10:
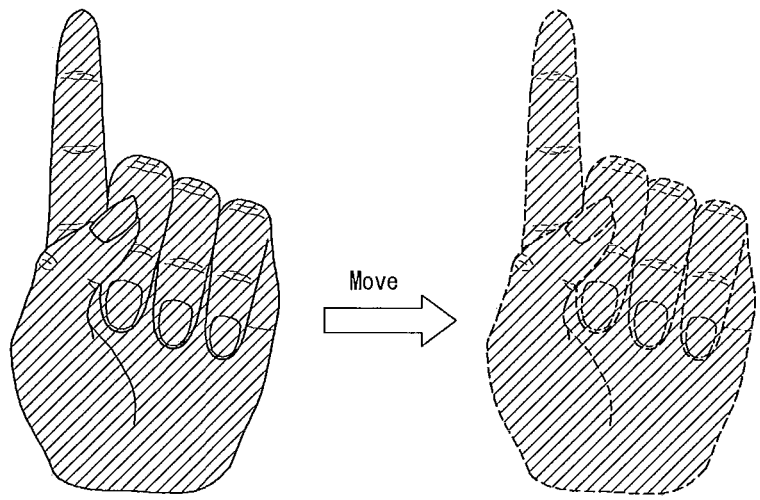
FIG. 10 is another drawing illustrating an image of a hand in the first embodiment of a method for gesture recognition according to the present invention.
Figure 11:
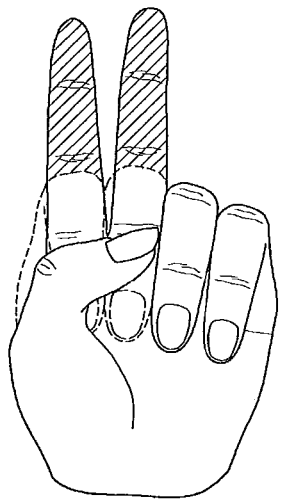
FIG. 11 is another drawing illustrating an image of a hand in the first embodiment of a method for gesture recognition according to the present invention.

The apparatus for gesture recognition 100 can obtain an area where a substantial depth difference occurs based on the depth information of the first and the second image S120. The current processing step will be described in detail with reference to FIGS. 6 to 11. FIG. 6 is a first drawing illustrating an example of a first image of a hand in the first embodiment of a method for gesture recognition according to the present invention; FIG. 7 is a first drawing illustrating an example of a second image of a hand in the first embodiment of a method for gesture recognition according to the present invention; FIG. 8 is a first drawing illustrating an example of an area obtained based on each depth information of the first and the second image in the first embodiment of a method for gesture recognition according to the present invention; FIG. 9 is a second drawing illustrating an example of an image of a hand in the first embodiment of a method for gesture recognition according to the present invention; FIG. 10 is a third drawing illustrating an example of an image of a hand in the first embodiment of a method for gesture recognition according to the present invention; FIG. 11 is a fourth drawing illustrating an example of an image of a hand in the first embodiment of a method for gesture recognition according to the present invention.

The controller 150 can obtain an area where a depth difference substantially occurs based on the depth information of the first and the second image. More specifically, the controller 150 can obtain an area formed by pixels where a substantial depth difference occurs by comparing the depth value of each pixel in the first image with that of the pixel in the second image corresponding to the pixel in the first image.

At this time, when the difference between the depth value of the first image and the depth value of the second image is larger than a predetermined threshold, the controller 150 determines that two corresponding depth values substantially differ from each other and that a substantial depth difference has occurred between the first and second images.

As shown in FIG. 6, the first image can be a hand image where a first finger is unfolded, while the second image of FIG. 7 can be a hand image where the first finger is folded. At this time, the first finger does not indicate a particular one, but any of the five fingers can be the first finger.

In this case, the controller 150, as shown in FIG. 8, after comparing the depth information of the first image with the depth information of the second image, can determine that a first area where the first finger is found in the first image and a second area where the first finger is found in the second image correspond to the areas where depth values differ from each other by more than a predetermined value.

At this time, the first area in the first image provides depth values corresponding to the distance to the first finger, while the first area in the second image provides depth values corresponding to the distance to the background. Since the difference between the depth values of the first and the second image is larger than a predetermined threshold, the controller 150 can determine that the first area corresponds to the area where the depth values of the first and second images substantially differ from each other.

On the other hand, the second area in the first image provides depth values corresponding to the distance to the palm, while the second area in the second image provides depth values corresponding to the distance to the first finger folded over the palm. Therefore, the variation of depth values is relatively small compared with that of the first area. When the predetermined threshold is larger than the thickness of the first finger, the controller 150 may not determine that the second area corresponds to the area where the depth values substantially differ.

Therefore, the controller 150 can obtain the first area as the area where the depth values (depth information of the first and second images) are substantially different from each other between the first and second images.

Meanwhile, in another example, even when the palm makes a right angle with the looking direction of the camera 111 as shown in FIG. 9 rather than face the camera 111 as shown in FIGS. 6 and 7, an area in the first image where the first finger is unfolded can be obtained as the area where the depth information of the first image and that of the second image are different from each other by more than a predetermined value.

Similarly, the controller 150 can obtain an area where the first finger is unfolded independently of the facing direction of the palm as the area where depth information of the first image and that of the second image are different from each other.

On the contrary, in the case that the first finger is unfolded from a folded state, too, the controller 150 can obtain the area where the first finger is unfolded as the area with substantially different depth information.

On the other hand, when the entire hand moves as shown in FIG. 10 or another finger other than the first finger is folded or unfolded simultaneously, the area where the other finger is folded or unfolded can be obtained as the area where the depth information of the first image and that of the second image are substantially different from each other.

Then the apparatus for gesture recognition 100 can recognize a finger gesture based on the size of this obtained area (S130).

For instance, the controller 150 can recognize a finger gesture based on the size of the obtained area where the depth difference between the first and second images is substantial. More specifically, the controller 150 can recognize a finger gesture when the size of the obtained area falls within a predetermined range.

At this time, the size of the obtained area can indicate the number of pixels included in the obtained area. That is to say, the controller 150 can recognize a finger gesture based on the number of pixels included in the obtained area.

For example, when a predetermined range is the number of pixels of the area corresponding to a single finger, the controller 150 can recognize a gesture made by the finger where the finger is unfolded from a folded state or on the contrary, a gesture made by the finger where the finger is folded from an unfolded state.

In another example, when a predetermined range is the number of pixels of the area corresponding to two fingers, the controller 150 can recognize a guest made by multiple fingers where the fingers (e.g., two fingers) are unfolded from a folded state or on the contrary, a gesture made by the multiple fingers where the fingers (e.g., two fingers) are folded from an unfolded state.

In yet another example, when the number of pixels whose depth values have been changed is more than a threshold, the controller 150 determines that the hand itself has moved and may not carry out the finger gesture recognition.

The storage module 140 can store input signals already determined according to predetermined ranges. The controller 150 can determine which range the number of pixels of an obtained area belongs to and process input signals based on the determination result.

To be specific, as an example only, an area occupied by a single finger comprises ten pixels; a first predetermined range ranges from 7 to 13, while a second predetermined range ranges from 17 to 23; the first predetermined range corresponds to a click signal, while the second predetermined range a double click signal.

When the user makes a gesture of unfolding or folding a finger, the controller 150 obtains ten pixels and receives the click signal and carries out an operation corresponding to the click signal. For example, when the controller 150 receives the click signal, the controller 150 can cut off power of the apparatus for gesture recognition 100 by controlling the power module 160. In addition, the controller 150 can display a cursor through the output module 120 and when the click signal is received, select an icon at the point where the cursor is positioned or carry out the operation corresponding to the icon.

In a similar way, when the user makes a gesture of unfolding or folding two fingers, the controller 150 obtains 20 pixels and receives the double click signal and carries out an operation corresponding to the double click signal. For example, the controller 150 can display a cursor through the output module 120 and when the double click signal is received, carry out various kinds of operation depending on the position of the cursor. For example, when the cursor is positioned on a particular icon, the icon can be executed.

According to the one embodiment of a method for gesture recognition according to the present invention, an apparatus for gesture recognition can recognize finger gestures. In the present invention, the finger gesture can be recognized by recognizing a finger motion based on depth information. Recognizing the finger motion by analyzing 2D images requires lots of computations and suffers low accuracy, whereas the present invention allows more robust recognition of inputs by making use of the depth information of multiple images of the subject being captured by the camera.

Also, according to the present invention, user fatigue involved is considerably low when a gesture input based on fingers is employed compared with gesture inputs based on hands or other body parts. Further, gesture inputs based on fingers are also intuitive and easily understandable to ordinary people, providing highly improved user convenience.

In addition, according to one embodiment of the present invention, since finger gestures can be recognized based on the areas with the depth information change, gesture recognition can be carried out without relying on learning the shape change of a hand.

Furthermore, according to one embodiment of the present invention, since the finger gesture is recognized based on the size of the area with the depth information change rather than the shape change of the hand as in the traditional technique, robust recognition of the finger at various view points is possible.

Moreover, according to one embodiment of the present invention, since the finger gesture can be recognized independently of the facing direction of a hand, user convenience can be improved.

Figure 12:
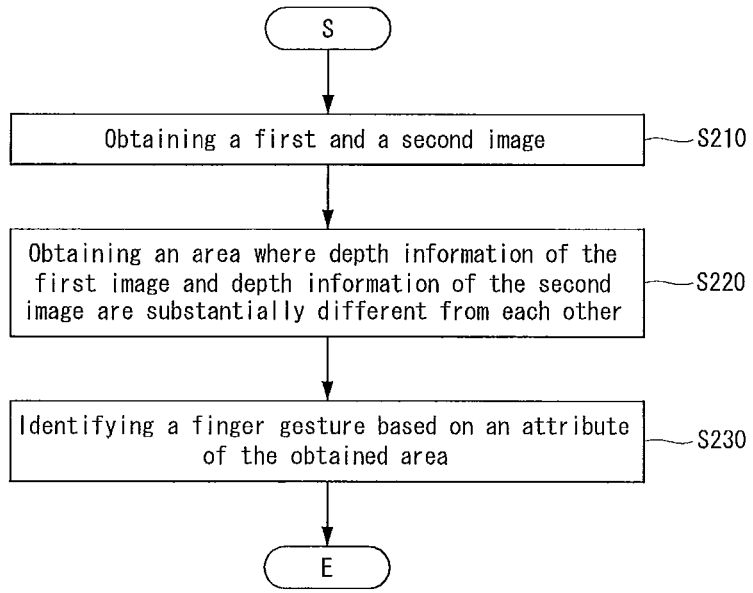
FIG. 12 is a flow chart of a second embodiment of a method according to the present invention.

In what follows, a second embodiment of a method for gesture recognition according to the present invention will be described with reference to FIG. 12. FIG. 12 is a flow chart of a second embodiment of a method according to the present invention.

As shown in FIG. 12, the second embodiment of a method for gesture recognition according to the present invention can comprise at least one of obtaining a first and a second image of a subject using the camera S210; obtaining an area where a substantial depth difference occurs based on the depth information of the first and the second image S220; and recognizing a finger gesture based on the attribute of the obtained area S230.

At this point, the obtaining the first and the second image S210 and obtaining the area where the substantial depth difference occurs based on the depth information of the first and the second image S220 may be the same as or similar to the description provided in the first embodiment of the method for gesture recognition according to the present invention. In the following, each step of the second embodiment of the present invention will be described in detail.

Figure 13:
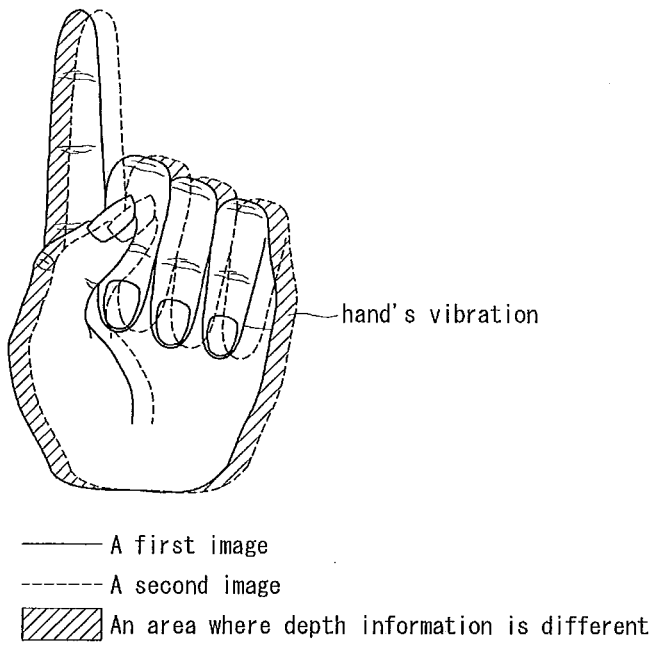
FIG. 13 illustrates a recognition error during gesture recognition in the second embodiment of a method for gesture recognition according to the present invention.
Figure 14:
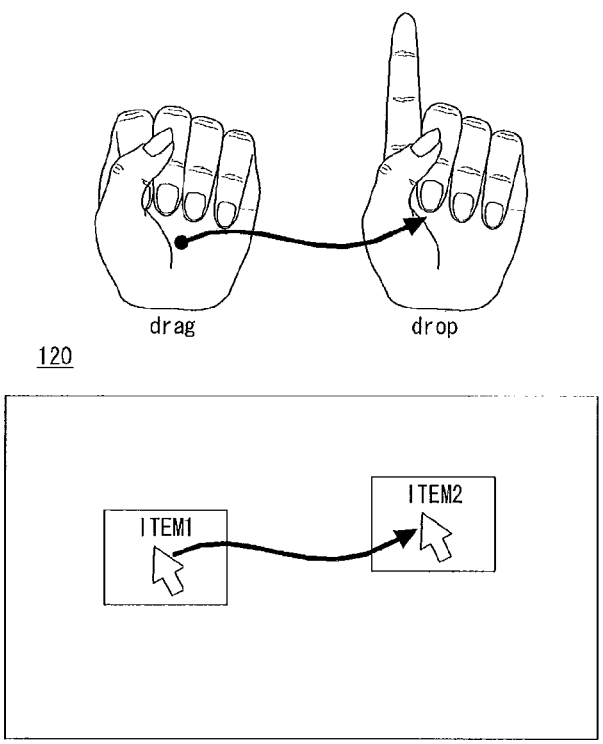
FIG. 14 is a drawing illustrating a motion made by a finger gesture in the second embodiment of a method for gesture recognition according to the present invention.
Figure 15:
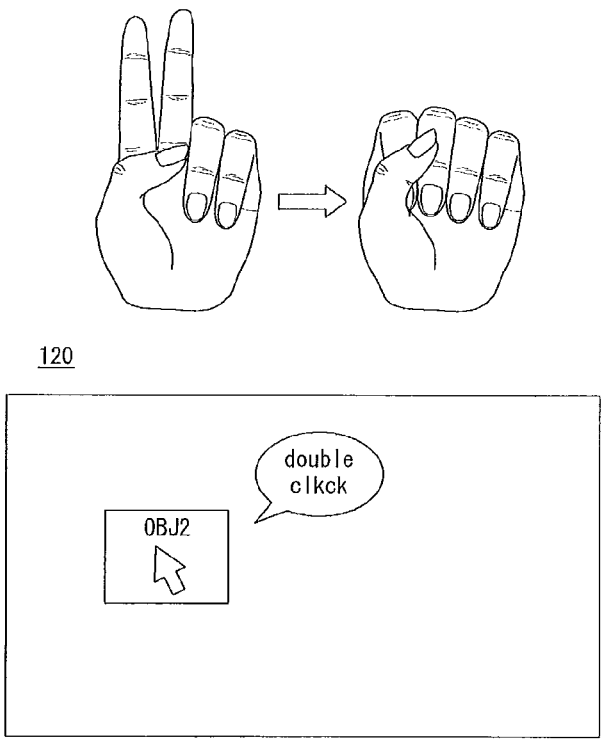
FIG. 15 is another drawing illustrating a motion made by a finger gesture in the second embodiment of a method for gesture recognition according to the present invention.

The apparatus for gesture recognition 100 can recognize a finger gesture based on the attribute of the obtained area where the depth information of the first information and the depth information of the second image differs from each other by more than a predetermined value S230. Regarding to this step, description will be provided with reference to FIGS. 13, 14, and 15. FIG. 13 illustrates a recognition error during a gesture recognition in the second embodiment of the method for gesture recognition according to the present invention. FIG. 14 is a first drawing illustrating an example of a motion made by a finger gesture in the second embodiment of a method for gesture recognition according to the present invention. FIG. 15 is a second drawing illustrating an example of a motion made by a finger gesture in the second embodiment of a method for gesture recognition according to the present invention.

The controller 150 can recognize a finger gesture based on the attribute of the obtained area. At this time, the attribute of the obtained area can include at least one from among the size of the area, e.g., the number of pixels included in the area; the difference between the depth values according to the depth information of the first image and those of the second image; a width of the area; and a deviation of the area.

According to the first embodiment described above, though the finger gesture is recognized based on the size of the obtained area, errors can occur due to various causes.

For example, since it may be difficult for the user to carry out a click motion while in a completely still state, as shown in FIG. 13, because of a hand shake, even when the user does not substantially make a finger gesture, the controller 150 can obtain areas where the depth information of the first image and the depth information of the second image are different from each other by more than a set amount. In this case, the controller 150 may carry out an erroneous operation corresponding to the finger gesture.

In another example, when other objects move inside the captured area of the camera 111 besides the user's hand, noise may be generated due to this and again, the controller 150 may perform an erroneous operation.

Therefore, the controller 150, to remove such erroneous operation, can recognize a finger gesture by taking into account of one or more of the attributes of the obtained area at one time. Examples of the various attributes of the obtained area will be discussed now.

In a first example, as described above, the controller 150 can recognize a finger gesture based on the size of the obtained area, namely, the number of pixels.

In a second example, the controller 150 can recognize a finger gesture based on the width of the obtained area. In other words, the controller 150 can recognize a finger gesture only if the width of the obtained area corresponds to the width of the finger. For example, as shown in FIG. 13, when the depth information has changed due to a hand shake, the width is smaller than that of the finger; on the contrary, when the entire hand has moved, the corresponding width is larger than that of the finger. Therefore, the controller 150 determines that such cases where the width of the area is smaller than that of the finger are not finger gestures.

In a third example, the controller 150 can recognize a finger gesture based on the deviation of the obtained area. At this point, the deviation can indicate a spatial distribution of the obtained area. The deviation can be defined in various ways, for example, it can be defined as the distance between the center of a hand to the obtained area.

When the deviation is larger than a predetermined reference, the controller 150 may not recognize the corresponding motion as a finger gesture. For example, when an object belonging to the background is moving while a hand image is being captured, an area where the depth information of the first image and that of the second image are different from each other extends to the object. In this case, since the deviation is supposed to be larger than a predetermined value, the controller 150 may not recognize the change of the depth information as a finger gesture.

The controller 150 applies an algorithm to remove such various errors, thereby reducing an error of recognizing a motion not corresponding to finger gesture as a finger gesture.

Again, according to the first embodiment described above, since the finger gesture is carried out based on the size of the obtained area only, the controller 150 may not sometimes distinguish a motion of folding a finger from that of unfolding a finger.

According to the present invention, the controller 150 can distinguish a motion of folding a finger from that of unfolding a finger based on the a difference between the depth information of the first image and that of the second image.

For example, when the first image relates to an image of a hand with its finger(s) unfolded out while the second image relates to an image of the hand with its fingers folded, the depth values of the first image for the area where the depth information of the first image and that of the second image are different from each other are smaller than the depth values of the second image. On the other hand, when the first and the second image are switched to each other, the depth values of the first image for an obtained area are larger than the depth values of the second image.

Therefore, the controller 150, depending on whether the change of the depth values is negative or positive, can identify a gesture of unfolding or folding a finger and according to the gesture, carry out a different operation assigned to the determined gesture.

For example, the controller 150 can carry out a press operation while performing a click operation according to the gesture of folding a finger. On the other hand, a release operation while performing a click operation may be performed by the controller 150 according to the gesture of unfolding a finger.

In another example, as shown in FIG. 14, when the user makes a gesture of folding a finger and moves his or her hand and again makes a gesture of unfolding the finger, the controller 150, according to the motion sequence, can implement a drag-n-drop operation on the screen of the apparatus 150 by initiating a drag operation on the screen when the finger is folded and carrying out a drop operation on the screen when the finger is unfolded.

In yet another example, when the hand moves after a gesture of folding a finger, the controller 150 can carry out a flicking operation accordingly on the screen (e.g., of the output module 120).

In still another example, as shown in FIG. 15, when a gesture of unfolding a finger is carried out after a gesture of folding a finger and the gesture of folding a finger is again carried out, the controller 150 can carry out a double click operation accordingly on the output module 120.

According to the second embodiment of a method for gesture recognition according to the present invention, since a finger gesture is recognized according to whether various attribute(s) of the obtained area correspond to predetermined criteria, an error caused at the time of recognizing a finger gesture can be reduced.

Also, according to the second embodiment of the present invention, more various kinds of operation can be performed by recognizing different finger gestures according to the differences between the depth values of the first image and those of the second image of the hand/finger(s).

Figure 16:
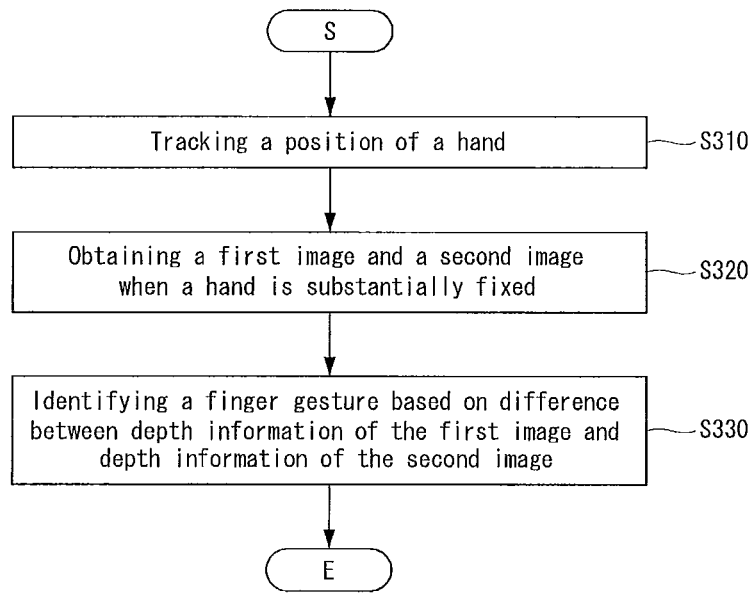
FIG. 16 is a flow chart of a third embodiment of a method for gesture recognition according to the present invention.

In what follows, a third embodiment of a method for gesture recognition according to the present invention will be described in detail with reference to FIG. 16. FIG. 16 is a flow chart of a third embodiment of a method for gesture recognition according to the present invention.

As shown in FIG. 16, the third embodiment of a method for gesture recognition according to the present invention comprises at least one from among tracking the position of a hand S310; obtaining a first and a second image of the hand when the hand substantially stands still S320; and recognizing a finger gesture based on the difference between the depth information of the first image and that of the second image S330.

At this time, the obtaining the first and the second image S320 and recognizing the finger gesture based on the difference between the depth information of the first image and that of the second image S330 may be the same as or similar to the description provided in the first and the second embodiment of the method for gesture recognition according to the present invention. In the following, each step of the third embodiment will be described in detail.

The apparatus for gesture recognition 100 can track the position of a hand of a user S310.

The controller 150 can track the position of the hand based on the images obtained through the camera 111. At this point, the camera 111 can be a 2D camera.

A 2D camera can obtain color images including the hand. The controller 150 can track the position of the hand by using color information of color images obtained through the 2D image. Since the user's hand takes on skin color, the controller 150 searches color images for an area to which a color substantially consistent with the skin color of a human is assigned and recognizes the area as the user's hand.

Meanwhile, the controller 150 can track the position of the hand and carry out the operation corresponding to the tracking result. For example, the controller 150 can control the output module 120 to display a cursor at the position corresponding to the hand's position.

Figure 17:
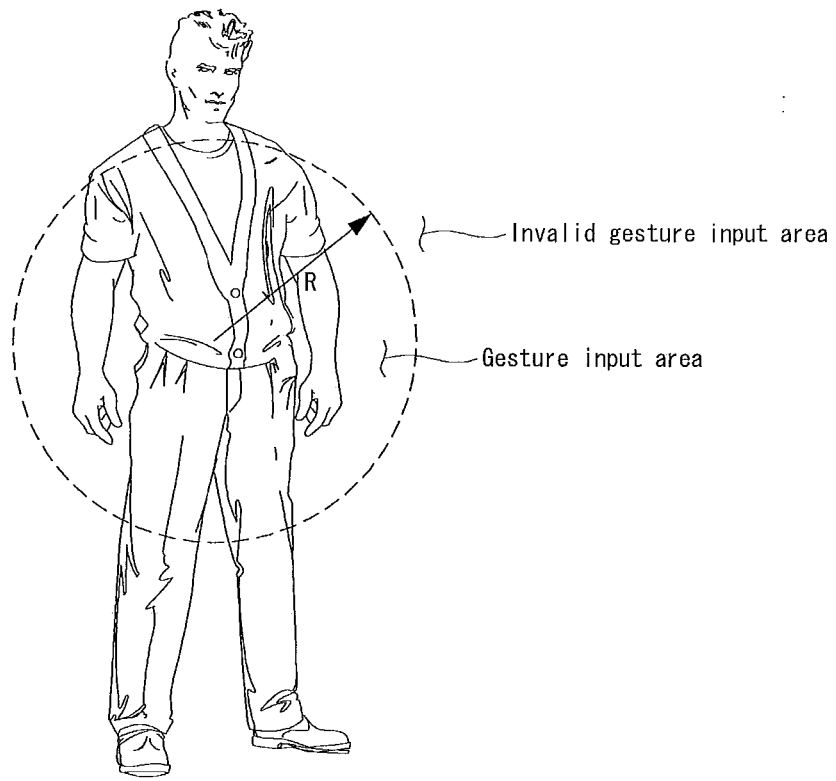
FIG. 17 illustrates an example of a valid area of finger gesture recognition depending on a finger position in the third embodiment of a method for gesture recognition according to the present invention.
Figure 18:
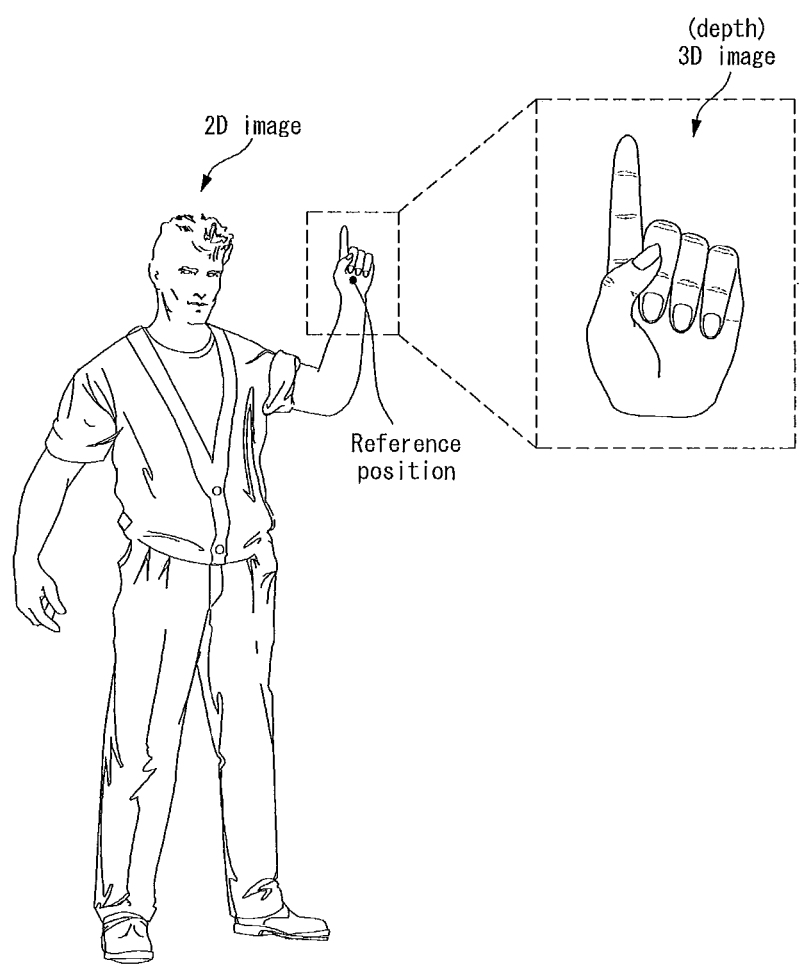
FIG. 18 illustrates a method of obtaining an image including depth information based on a finger position in the third embodiment of a method for gesture recognition according to the present invention.

The apparatus for gesture recognition 100 can obtain the first and the second image of the hand when the hand is substantially fixed (e.g., the hand does not move by more than a fixed amount) S320. Regarding this step, descriptions will be given with reference to FIGS. 17 and 18. FIG. 17 illustrates an example of a valid area of finger gesture recognition depending on a finger position in the third embodiment of a method for gesture recognition according to the present invention; FIG. 18 illustrates a method of obtaining an image including depth information based on a finger position in the third embodiment of a method for gesture recognition according to the present invention.

The controller 150 tracks the position of a hand of the user being captured by the camera 111 by using images obtained through the camera 111 and when the position of the tracked hand stays the same for a predetermined time period (e.g., with no position change or with a minimal variation), determines that the hand is stationary. When the hand stands still, the controller 150 can obtain the first and the second image including depth image of the hand through a 3D camera.

Since the user usually does not provide a particular signal while moving his or her hand, the controller 150 can obtain the first and the second image of the user's hand when the user's hand stands still. Accordingly, since the user's hand is stationary in the obtained images, the depth information about the remaining part of the hand except for fingers can be the same for the first and the second image. By using this fact, the controller 150 can reduce errors caused during recognition of finger gesture.

Also, the controller 150 may not recognize a figure gesture depending on the position of the user's hand. The user can use his or her finger in addition to the case of making a gesture for operating the apparatus for gesture recognition 100. If the apparatus for gesture recognition 100 always recognizes a gesture and carries out some operation according to the recognition result, the user might rather feel uncomfortable.

Therefore, the controller 150 can be made to receive inputs of finger gesture only when the hand is positioned in particular space or in a particular area. For example, as shown in FIG. 17, when a finger is outside of a particular area, the controller 150 may recognize this as no input of finger gesture is being made. For instance, when the hand is positioned outside a predetermined gesture input area, then any gesture made by the hand in that invalid gesture input area would not be considered by the controller 150.

In addition, the controller 150 can obtain the first and the second image of the hand in its entirety or a part thereof according to the position of the user's hand. Since the resolution of a 3D camera is usually lower than that of a 2D camera, to recognize a finger gesture more accurately, the controller 150, as shown in FIG. 18, can control the capture area of the 3D camera so that the 3D camera can obtain images of an area of a predetermined range with respect to the center of the hand. Therefore, the controller 150 can obtain an depth image of the hand with higher resolution, thereby obtaining more accurate depth information.

Meanwhile, when it is determined that the hand is moving, the controller 150 can carry out a predetermined operation according to the movement of the hand/finger(s). For example, when the output module 120 displays a cursor, the controller 150 can control the movement of the cursor according to the movement of the hand.

According to the third embodiment of a method for gesture recognition according to the present invention, as images including depth information are obtained when the user's hand stands still, inputting of a signal corresponding to a finger gesture can be prevented while the user's hand is moving.

In addition, according to the third embodiment, since the other part of a hand except for fingers making a gesture is stationary, the recognition rate for the finger gesture can be improved.

In what follows, a fourth embodiment of a method for gesture recognition according to the present invention will be described in detail with reference to FIG. 19. FIG. 19 is a flow chart of a fourth embodiment of a method for gesture recognition according to the present invention.

As shown in FIG. 19, a fourth embodiment of a method for gesture recognition according to the present invention comprises at least one of obtaining a first and a second image of a hand or a part of the hand S410, obtaining an area where a substantial depth difference occurs based on the depth information of the first and the second image S420, recognizing a finger gesture based on at least one attribute of the obtained area S430, and carrying out an operation assigned to the recognized finger gesture S440.

At this time, the obtaining the first and the second image S410 and the obtaining the area where the substantial depth difference occurs based on the depth information of the first and the second image S420 can be the same as or similar to the description provided in the first, the second, and the third embodiment of a method for gesture recognition according to the present invention. In the following, each step of the fourth embodiment of the present invention will be described.

The apparatus for gesture recognition 100 can recognize a finger gesture based on the attribute of the obtained area S430. Regarding this step, description will be provided with reference to FIG. 20. FIG. 20 illustrates various examples of a finger gesture assigned to the attribute of the obtained area in the fourth embodiment of the method for gesture recognition according to the present invention.

The controller 150 can recognize a finger gesture based on the attribute of the obtained area at step S430. Information about the attribute(s) of at least one area related to at least one finger gesture is stored in the storage module 140 and such information can correspond to that of FIG. 20. The controller 150 can recognize a specific finger gesture by comparing the attribute of the obtained area with the information stored in the storage module 140. As shown in FIG. 20, the finger gesture can be classified into a motion of folding a finger, a motion of unfolding a finger, and a motion of folding two fingers.

The controller 150 classifies a finger gesture according to the attribute of the obtained area, obtaining various inputs through the user's finger gesture.

Then the apparatus for gesture recognition 100 can carry out an operation assigned to the recognized finger gesture S440.

For instance, the controller 150 can carry out the operation assigned to the type of recognized finger gesture. Detailed descriptions related to the above have been provided while the first, the second, and the third embodiment of a method for gesture recognition according to the present invention were described.

The controller 150, by using the position information of a hand, can control the output module 120 to display a cursor at the point corresponding to the hand's position. The user can operate the cursor by using his or her finger or finger gesture. The finger gesture and the operation of the apparatus for gesture recognition 100 will be described with reference to FIG. 21. FIG. 21 illustrates examples of motions associated with finger gestures in the fourth embodiment of the method for gesture recognition according to the present invention.

For example, the apparatus for gesture recognition 100 can carry out a click operation according to the gesture of folding or unfolding a finger. When such a gesture is input, the controller 150 recognizes the gesture as a click motion and selects an item located at the point where the cursor is displayed on a screen of the output module 120.

In another example, the apparatus for gesture recognition 100 can carry out a double click operation according to the gesture of folding or unfolding two fingers. When such a gesture is input, the controller 150 recognizes the gesture as a double click motion and executes the item located at the point where the cursor is displayed on the screen of the output module 120.

In a yet another example, the apparatus for gesture recognition 100 can carry out a press operation while performing a click operation according to the gesture of folding a finger. When such a gesture is input, the controller 150 can enter a drag mode for the item located at the point where the cursor is displayed on the screen of the apparatus 100. After entering the drag mode, the controller 150 obtains the position information of the hand and based on the position information, can carry out the operation of moving the item.

In a still another example, the apparatus for gesture recognition 100 can carry out a release operation while performing a click operation according to the gesture of unfolding a finger. When such a gesture is input while the controller 150 is in the drag mode, the controller 150 can release the drag mode. According to such a gesture, drag-n-drop operation would be made possible.

Similarly, the apparatus for gesture recognition 100 can carry out a flicking operation according to the gesture of folding a finger and movement of the hand's position.

Besides, the controller 150 recognizes a finger gesture and can directly carry out a specifically assigned operation according to the recognition result.

For example, according to a gesture of folding or unfolding one or two fingers, control for gesture recognition can be given to the hand including the finger(s). Further, instead of one or more fingers being moved, a hand movement such as folding/unfolding the hand or flicking the hand, can be used as a gesture input. When both hands are involved in gesture recognition, the controller 150 can analyze both hands with the control.

Also, according to the finger gestures, the controller 150 can carry out various types of operation such as power on/off, audio muting and unmuting, and video play and stop. The storage module 140 stores the operation instructions of the apparatus for gesture recognition corresponding to at least one from among a gesture of folding a finger, a gesture of unfolding a finger, a gesture of folding and unfolding a finger, a gesture of folding two fingers, a gesture of unfolding two fingers, and a gesture of folding and unfolding two fingers. The controller 150, by referring to the storage module 140, can carry out at least one operation corresponding to the finger gesture.

On the other hand, when compared with methods based on general input devices, the input interface based on finger gesture may give rise to a problem that the user cannot make sure whether an input has been successfully received.

Figure 22:
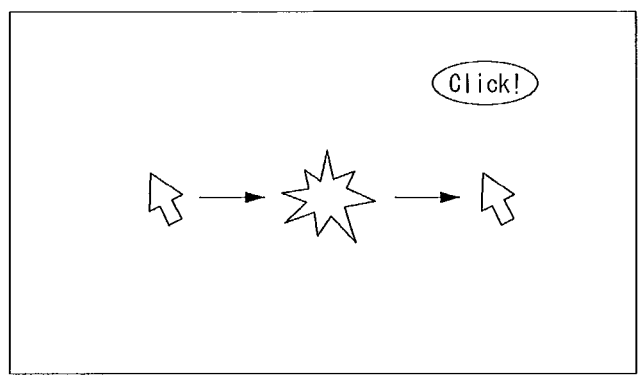
FIG. 22 illustrates an output module for displaying information about input gesture in the fourth embodiment of a method for gesture recognition according to the present invention.
Figure 23:
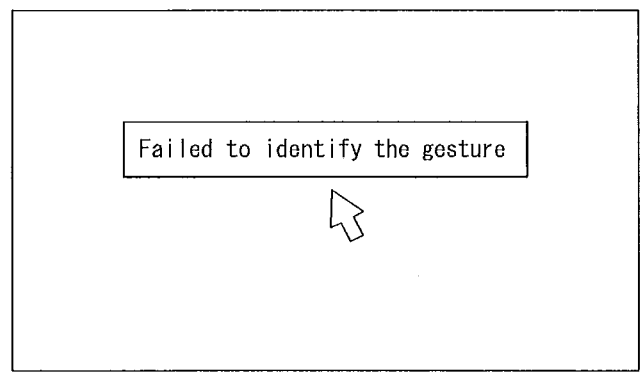
FIG. 23 illustrates an output module for displaying an input error of finger gesture in the fourth embodiment of a method for gesture recognition according to the present invention.

Therefore, the controller 150 can inform the user of the gesture signal input through the output module 120. Regarding to the informing, descriptions will be given with reference to FIGS. 22 and 23. FIG. 22 illustrates an output module displaying information about an input gesture in the fourth embodiment of a method for gesture recognition according to the present invention, and FIG. 23 illustrates an output module displaying an input error of finger gesture in the fourth embodiment of a method for gesture recognition according to the present invention.

For example, as described above, when a motion of folding or unfolding a finger or a click gesture made by one or two fingers is received, the controller 150 can display information or output an audio reflecting a click or a double click on a screen or entering the drag mode.

As shown in FIG. 22, the controller 150 can inform the user of the gesture input by controlling the output module 120 to display a message on the screen or changing the attribute of the cursor such as color, shape, and the like.

Meanwhile, the controller 150 can control the output module 120 to output information that informs the user of a gesture input error when the corresponding gesture has not been successfully received.

For example, although an area where the depth information of the first image and that of the second image are different from each other occurs, when the controller 150 fails to relate the area to a particular gesture or determines that the attribute(s) of the area do not correspond to a particular gesture, the controller 150 can control the output module 120 to output information that informs the user of a gesture input error.

In this case, as shown in FIG. 23, the controller 150 can display a message on the screen through the output module 120 or output a voice, informing the user of the input error.

According to the fourth embodiment of a method for gesture recognition according to the present invention, various kinds of finger gesture can be recognized and an operation according to the recognition result can be carried out.

Also, according to the fourth embodiment of the present invention, by providing an intuitive user interface, with which the user can immediately know whether a gesture input has been received, the user convenience can be improved.

The embodiments of a method for gesture recognition according to the present invention described above can be utilized individually or in the form of a combination with others. The processing steps constituting each embodiment can be utilized with those steps constituting other embodiments individually or in the form of a combination with other steps.

Also, each embodiment of a method for gesture recognition according to the present invention described above can be provided as being recorded in a computer-readable recording medium in the form of a program that can be executed in a computer. Each embodiment of the present invention can be executed through software. When the embodiment is executed through software, constituting means of the present invention are code segments that execute required operations. Programs or code segments can be stored in a processor-understandable medium or can be transmitted through a transmission medium or computer data signals combined with carrier waves in a communication network.

A computer-readable recording medium includes all kinds of recording devices which store data that can be read by a computer system. Examples of computer-readable recording medium include ROM, RAM, CD-ROM, DVD±ROM, DVD-RAM, a magnetic tape, a floppy disk, a hard disk, and an optical data storage device. Also, computer-readable media can be distributed in computing devices connected to each through a network; programs codes that can be interpreted by a computer can be stored and executed in a distributed manner.

Various kinds of substitution, modification, and variation of the present invention are possible to those skilled in the art to which the present invention belongs within the technical principles and scope of the present invention; therefore, the present invention is not limited to the embodiments and appended drawings described above. Also, the embodiments described in this document are not limited to specific situations, but all or part of each embodiment can be combined selectively with all or part of the other embodiments to enable various modifications of the present invention.

According to the present invention, the user can operate an apparatus for gesture recognition without separate input means.

According to the present invention, a method for recognizing finger gestures and an apparatus for carrying out the method can be provided.

According to the present invention, as the user operates an apparatus for gesture recognition with a minimal motion based on figure gestures, the user convenience can be improved.

According to the present invention, a method for recognizing gesture that does not incorporate a learning process for the change of a hand shape and an apparatus for carrying out the method can be provided.

According to the present invention, a method and an apparatus for recognizing finger gestures in a robust manner independently of an angular pose of the finger can be provided.

According to the present invention, since finger gestures can be recognized independently of a pointing direction of the finger, a method and an apparatus for gesture recognition with improved user convenience can be provided.

According to the present invention, a method and an apparatus for gesture recognition that improve a recognition rate for finger gestures by taking account of the attribute of the area where a depth information change occurs at the time of recognizing the finger gesture can be provided.

According to the present invention, a method and an apparatus for identifying various finger gestures can be provided.

According to the present invention, the user can operate an apparatus for gesture recognition without relying on separate input means.

What is claimed is:
1. An apparatus for gesture recognition, comprising:
a controller configured to:
obtain, via a 3D camera, a first image having first depth information and a second image having second depth information, wherein each of the first and second images includes at least a part of a hand respectively, track the hand from the first image and the second image,
select a first area of a predetermined range with respect to a center of the tracked hand in the first image and the second image,
adjust a resolution of the selected first area to be higher than the other areas of the first image and the second image,
identify a finger gesture for remotely controlling an operation of the apparatus by the hand based on a difference between the first depth information and the second depth information, and a size of a second area where the first depth information and the second depth information of the adjusted first image and second image are substantially different from each other,
determine an erroneous identification of the finger gesture when a deviation of the second area is larger than a predetermined reference, wherein the deviation of the second area is defined as a distance between the center of the hand and the second area,
select a valid finger gesture of the identified finger gesture by removing the determined erroneous identification of the finger gesture, and
perform the operation according to the selected valid finger gesture.

2. The apparatus of claim 1, wherein the 3D camera is integrated into the apparatus or is an external device.

3. The apparatus of claim 1, wherein the finger gesture is identified by a movement of one or two fingers of the hand.

4. The apparatus of claim 1, wherein the finger gesture is identified by a movement of three or more fingers of the hand.

5. The apparatus of claim 1, wherein the finger gesture includes a drag-and-click gesture, a click gesture, or a double click gesture according to a gesture of at least one finger of the hand.

6. The apparatus of claim 1, wherein when identifying the finger gesture, the controller obtains depth difference information between the first and second depth information for the hand while the hand is not moved or is moved within a certain range, and identifies the finger gesture based on a movement of at least one finger detected from the obtained depth difference information.

7. The apparatus of claim 1, further comprising an output module,
wherein the controller obtains a position of the hand and controls the output module to output a cursor at a point corresponding to the position of the hand, on a screen of the output module.

8. The apparatus of claim 7, wherein when the finger gesture is received, the controller selects an item or executes an operation related to the item, wherein the item is located at the point where the cursor is displayed.

9. The apparatus of claim 1, wherein the 3D camera includes a TOF (Time Of Flight) camera or a structured light source camera.

10. The apparatus of claim 1, wherein the depth information includes information reflecting a depth of each pixel.

11. The apparatus of claim 10, wherein the controller identifies the finger gesture based on at least one of the number of pixels where a difference between the first depth information and the second depth information is larger than a predetermined value, and a deviation of the pixels.

12. A method for controlling an apparatus for gesture recognition, the apparatus including a controller, the method comprising:
obtaining, via a 3D camera communicating with the controller, a first image having first depth information and a second image having second depth information, wherein each of the first and second images includes at least a part of a hand respectively;
tracking the hand from the first image and the second image;
selecting a first area of a predetermined range with respect to a center of the tracked hand in the first image and the second image;
adjusting a resolution of the selected first area to be higher than other areas of the first image and the second image;
identifying, by the controller, a finger gesture for remotely controlling an operation of the apparatus by the hand based on a difference between the first depth information and the second depth information, and a size of a second area where the first depth information and the second depth information of the adjusted first image and second image are substantially different from each other;
determining an erroneous identification of the finger gesture when a deviation of the second area is larger than a predetermined reference, wherein the deviation of the second area is defined as a distance between the center of the hand and the second area;
selecting a valid finger gesture of the identified finger gesture by removing the determined erroneous identification of the finger gesture; and
performing, by the controller, the operation according to the selected valid finger gesture.

13. The method of claim 12, wherein when the size of the area is included in a first predetermined range, the identifying step determines the finger gesture as a first gesture by a single finger, and
when the first gesture is received, the performing step performs an operation assigned to a click motion.

14. The method of claim 12, wherein when the size of the area included in a second predetermined range, the identifying step determines the finger gesture as a second gesture by two fingers, and
when the second gesture is received, the performing step performs an operation assigned to a double click motion.

* * * * *